United States Patent
Olcott

[11] 3,881,270
[45] May 6, 1975

[54] BITE INDICATING DEVICE
[76] Inventor: Herbert K. Olcott, Keansburg, Middletown Township, N.J. 07748
[22] Filed: July 11, 1973
[21] Appl. No.: 379,541

[52] U.S. Cl. .................................................. 43/17
[51] Int. Cl. ............................................ A01k 97/12
[58] Field of Search ......................................... 43/17

[56] References Cited
UNITED STATES PATENTS

| | | |
|---|---|---|
| 1,815,662 | 7/1931 | Bacon .................................... 43/17 |
| 2,196,784 | 4/1940 | Simmons et al. ........................ 43/17 |
| 2,574,333 | 11/1951 | Kuczynski et al ....................... 43/17 |
| 3,148,473 | 9/1964 | Miller .................................... 43/17 |

*Primary Examiner*—Louis G. Mancene
*Assistant Examiner*—Daniel J. Leach

[57] ABSTRACT

A bite indicating device consisting of a spring clip, flashlight, lead and ball assembly constructed in a conductive manner. The flashlight is attached to the spring clip with the lead extending therefrom to the ball which has a slot therein. When the spring clip is attached to the sides of a metal line guide of any fishing pole with a fishing line inserted in the slot of the ball behind this metal line guide, a forward movement of the fishing line will create contact between the ball attachment and line guide. Thereby closing an electrical circuit to actuate the flashlight.

4 Claims, 2 Drawing Figures

PATENTED MAY 6 1975

3,881,270

BITE INDICATING DEVICE

This invention relates to a new and different bite indicating device for night fishing. It needs no mechanical or spring type extensions that could interfere with, or bend out of shape while in use or storage by fishermen.

The main object of this invention is to provide a fish bite indicating device for coupling a fishing line and which separates therefrom upon actuation.

Another feature of the invention is that it can be operated as a common basic flashlight when not in use.

Figure 1:
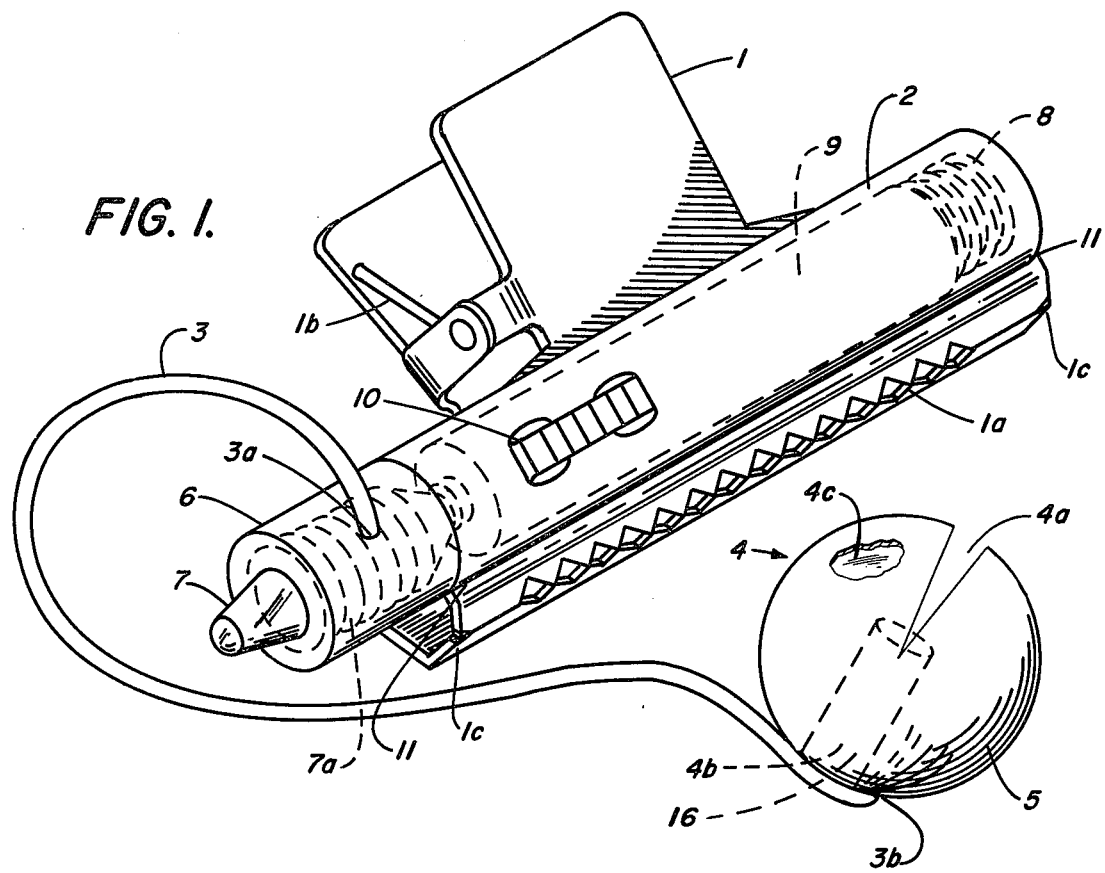

All of the foregoing objects, and features contained within will become fully apparent from the following description when read in connection with the accompanying drawing in which FIG. 1 is a perspective view of the indicating device of the present invention and showing the required parts.

Figure 2:
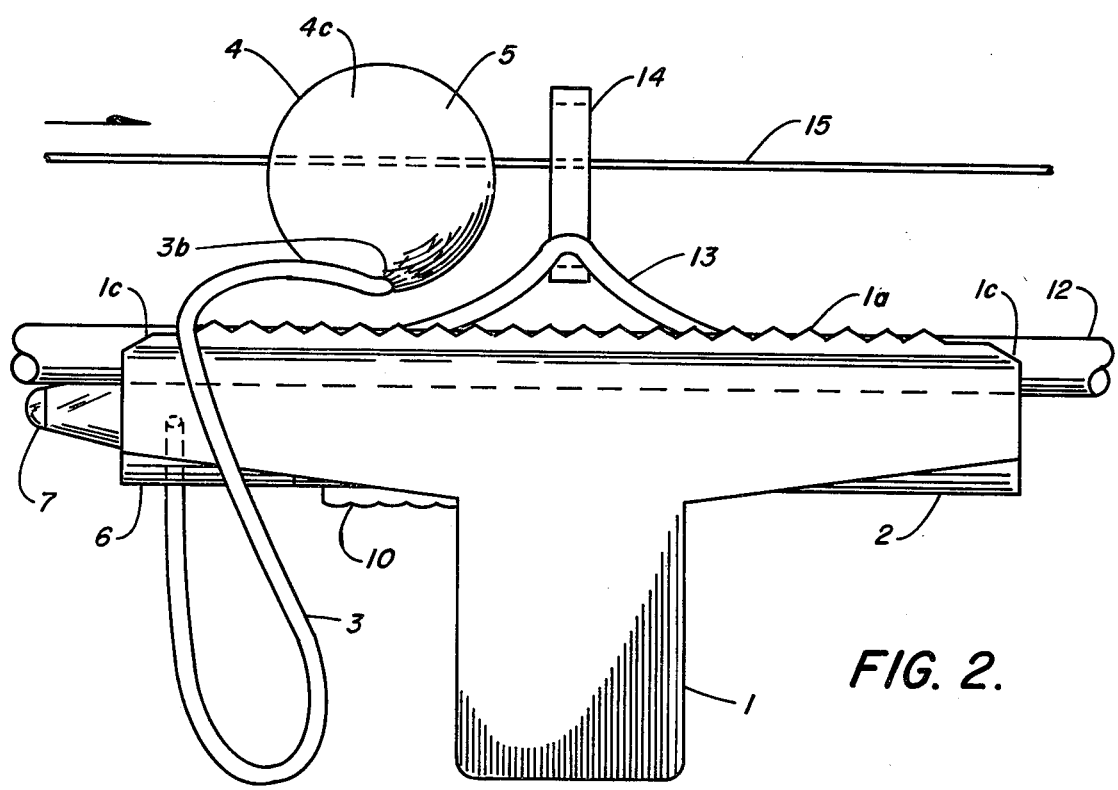

FIG. 2 is an elevational view of the indicating device attached to a metal line guide and fishing line of a fishing rod and with the device in a set position.

Referring now to the drawing, conventional parts of a fishing rod assembly illustrated therein include a portion of a rod member 12, a fishing line guide side member 13 and fishing line guide 14, both formed of an electrically conductive material, and the fishing line 15. The device of the new invention includes a metallic clip 1 having a pair of semi-circular portions biased together by a spring 1b to form a cylindrical housing with serrated edges or tooth jaws 1a along the outer sides of said semi-circular portions and that attach to the sides of a metal line guide 13, with the body of the clip 1 being connected to the external housing container 2 of a flashlight assembly in a conductive manner as to maintain a flow of electricity when required.

A conductive lead 3 comprising extra flexible stranded conductor with a external extruded protective coating is inserted through the forward end of the bulb housing hub 6 of said flashlight and connected in an electrically conductive path 3a to the metal base body of bulb 7a. The other end of lead 3 is stripped and adhered to the ball assembly 4. The base material for the ball is preferably of cork 4c or rubber, the ball being constructed with a center portion 4b, filled with a silicone putty substance 16. A thin layer of a soft metallic metal 5 is bonded 5a to the ball 4 over the stripped stranded conductor 3b. A tapered slot 4a is cut 1/2 to 5/8 through the ball for insertion of any size fishing line. The above described ball assembly is constructed of materials that will not cut or fray any fishing line 15 including the monofilament types.

As shown particularly in FIG. 2, the device of the invention is coupled to a fishing pole or rod via the spring clip assembly such that the serrated edges thereof conductively engage the legs or sides of the metal line guide 14. The fishing line 15 is frictionally received within the tapered slot in the ball 4 with said ball being positioned rearwardly of the line guide such that a pull on the line causes the ball to engage the line guide to complete an electrical circuit to actuate the flashlight, thus indicating the bite of a fish; the circuit path being from one side of the battery 9 to bulb base 7a through lead 3 to ball 4 then through metallic coating 5 to line guide 14 when abutted.

The circuit path continues from the line guide 14 to line guide sides 13 to clip jaws 1a through clip 1, continuing through the external flashlight housing 2 through spring 8 to negative side of battery 9 to bulb base 7a.

The standard flashlight switch 10 can be used when the device is not in operation to actuate the light for multiple purposes during night fishing.

It will be noted that upon actuation of the indicating light due to a pull on the fishing line, the ball assembly 4 will disengage from the fishing line and drop away leaving no obstructions in the path of the line.

It will also be noted that adjustment of the pull on the fishing line required before the light is actuated can be made by merely varying the distance from the metallic line guide at which the ball assembly is coupled to the fishing line.

It is understood that the foregoing information described herein is a good understanding of my invention. Various improvements and/or modifications in construction of embodiment that fall within its scope can be made as claimed.

What is claimed is:

1. A bite indicating device comprising a springloaded clip attachable to the legs of a line guide on a fishing rod with a fishing line extending through said line guide, said clip having a pair of semi-circular portions biased together by spring means to form a cylindrical housing and serrated edges along the outer sides of said semi-circular portion, said serrated edges engaging the legs of a line guide, a flashlight having a bulb housing disposed in said cylindrical housing, a flexible insulated conductor wire connected to the flashlight bulb and extending outwardly through the bulb housing attached at its outer end to a ball coated with conductive metallic material and formed with a tapered slot therein, said ball engaging the fishing line rearwardly of the line guide with the line being frictionally retained in the ball slot, whereby a pull on the line causes the said ball to engage the line guide and complete an electrical circuit to actuate the flashlight, thus indicating the bite of a fish.

2. A bite indicating device as defined in claim 1 wherein said ball is formed of cork material.

3. A bite indicating device as defined in claim 1 wherein said ball is formed of rubber material.

4. A bite indicating device as defined in claim 1 wherein said clip is fixed, as by spot welding, to the flashlight housing.

* * * * *